Nov. 6, 1951 A. J. ORTUSI ET AL 2,574,055

TRANSMITTER RECEIVER DUPLEXING CIRCUIT FOR RADAR APPARATUS

Filed Jan. 17, 1949 2 SHEETS—SHEET 1

INVENTORS:-
ANTOINE JEAN ORTUSI,
PATRICE FECHNER,

By John B. Brady
ATTORNEY

TRANSMITTER RECEIVER DUPLEXING CIRCUIT FOR RADAR APPARATUS

Filed Jan. 17, 1949

INVENTORS:—
ANTOINE JEAN ORTUSI,
PATRICE FECHNER,
by John B. Brady
ATTORNEY

Patented Nov. 6, 1951

2,574,055

UNITED STATES PATENT OFFICE 2,574,055

TRANSMITTER RECEIVER DUPLEXING CIRCUIT FOR RADAR APPARATUS

Antoine Jean Ortusi and Patrice Fechner, Paris, France, assignors to Compagnie Generale de Telegraphie Sans Fil, a corporation of France Application January 17, 1949, Serial No. 71,263
In France February 4, 1948

2 Claims. (Cl. 250—13)

The present invention relates to an improvements in the device described in the patent application filed on July 19, 1946, in the United States, Serial No. 684,820, entitled: "Improvements in or relating to a method of and means for the radio-electric detection of obstacles," in which a single antenna was used for transmitting and receiving high frequency signals in a radiolocation system, said antenna being supplied by two different guides, one of which was connected to the transmitter, the other to the receiver. With each of said two guides was associated a variable tuning resonator, each of which formed a reactance that transferred a variable impedance to each of said guides, one of said resonators being intended to protect the receiver during the transmission of a signal, the other to isolate the transmitter during the reception of the echo.

The present invention has for its object an improved embodiment of this dual protecting system, wherein use is made of a single variable reactance to render simultaneously, either the receiver-guide non-conducting and the transmitter-guide conducting, or to obtain the converse result, said variable reactance being located outside these two guides. In this manner the installation is simplified and the operation thereof is made more convenient and moreover becomes more reliable.

According to the invention, said reactance, which is adapted to vary proportionally to one of its parameters, in particular to its voltage, is connected to both the transmitter and receiver guides by cables, in particular coaxial cables, the lengths of which are so calculated that the impedance transferred to one of the two guides is zero, and the impedance transferred to the other guide is infinite, means being provided for automatically varying said parameter in such a manner as to reverse these conditions.

According to a form of embodiment of the invention, said variable reactance comprises a magnetron, the anode voltage of which is made to vary.

The invention also applies to any device for regulating the distribution of the power from a single channel between two U. H. F. channels, its being possible for this regulation to be sudden (triggered off or on) or gradual. It also applies to the converse arrangement which is adapted to feed successively into a common channel, the ultra-high frequency signals from two separate supply channels.

The invention will be more clearly understood by means of the accompanying figures which show, by way of non-limitative examples, a number of embodiments thereof.

Figure 4:
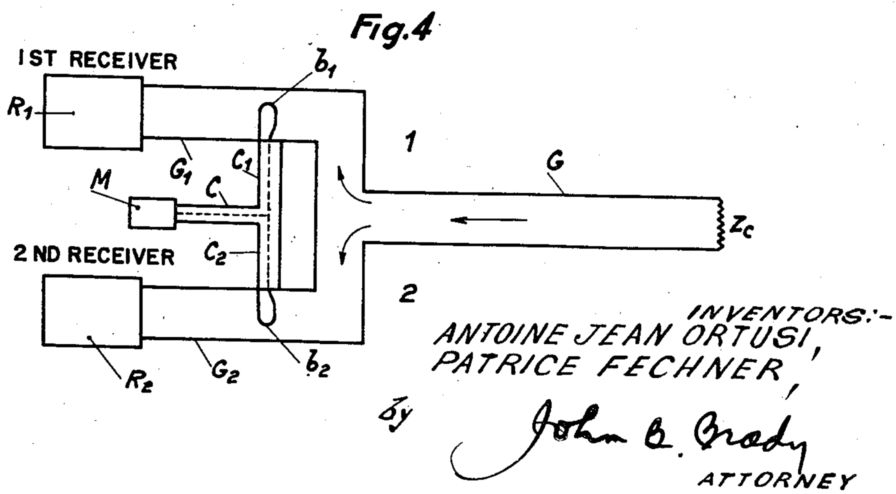
Figure 3:
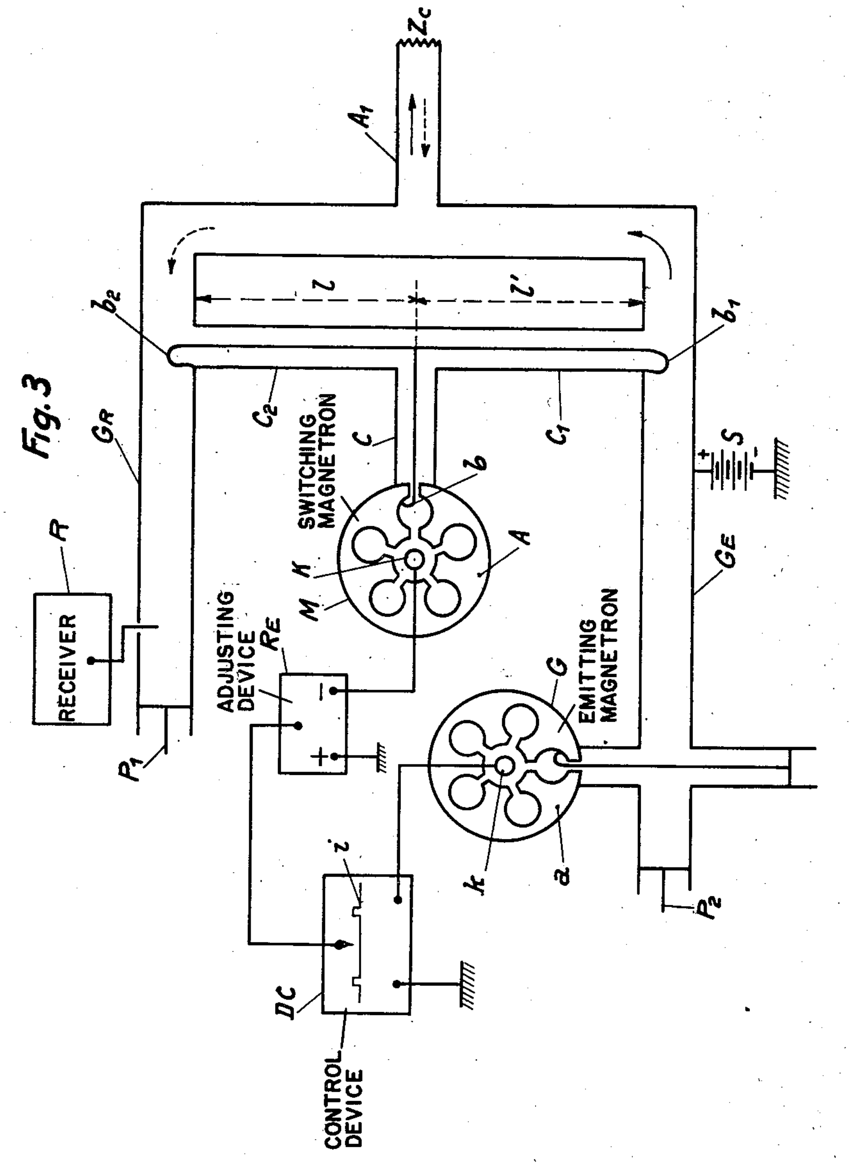

Fig. 3 shows a form of embodiment of the invention as applied to a transmitter-receiver device using a single antenna; and Fig. 4 shows a diagrammatic view of the embodiment relating to a device for regulating the distribution of the power between two U. H. F. channels.

Figure 1:
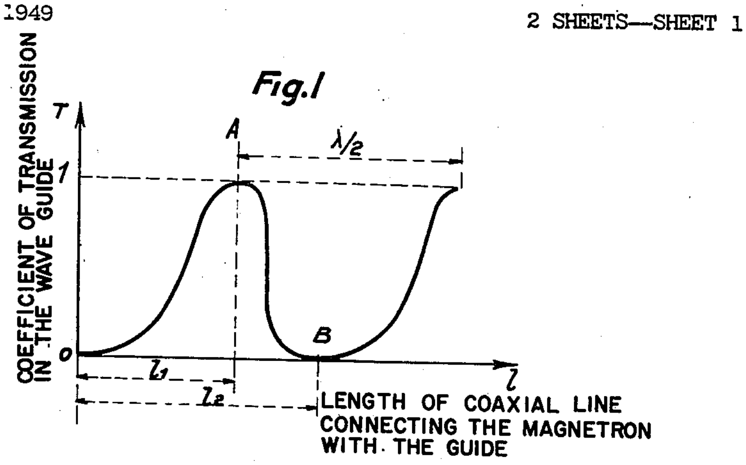
Fig. 1 shows a curve that gives the value of the coefficient of transmission in a guide as a function of the length of the coaxial cable connecting a magnetron to said guide.

In the French patent application for "Improvements in the methods and apparatus for modulating ultra-short waves," filed by the Compagnie Generale de Telegraphie Sans Fil, on February 6, 1945, it was observed that when a magnetron is connected to a guide by means of a coaxial cable, said magnetron transfers to the guide an impedance that varies, on the one hand with the length of the coaxial cable, and on the other hand with the voltage supplied between the electrodes of the magnetron. If the anode voltage of the magnetron is allowed to remain at zero, Fig. 1 shows the variations of the coefficient of transmission T in the guide as a function of the length $l$ of the coaxial cable. When the length of the coaxial cable is $l_1$, the transferred impedance in the guide is infinite, and the transmission is effected completely; when the length of said cable is $l_2$, the transferred impedance in the guide is zero and the transmission is stopped. Between two successive maximums, the length $l$ varies half a wave-length, $l_1$ and $l_2$ being approximately equal to $(2n+1)\lambda/4$ and $$\frac{n\lambda}{2}$$

respectively wherein $n$ is an integer and $\lambda$ the wavelength.

Figure 2:
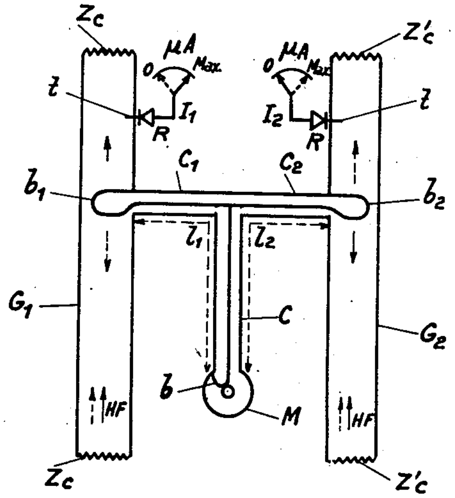
Fig. 2 shows a diagram of the principle of the invention.

Fig. 2 represents the diagram of principle that shows how the foregoing discovery has been used for carrying out the invention. In this figure, $G_1$ and $G_2$ represent two rectangular wave-guides, each of which is terminated by its characteristic impedance $Z_c$ and $Z'_c$ respectively. A magnetron M is connected to said guides by means of two coaxial cables $C_1$, $C_2$ that lead to a common coaxial cable C which is coupled to the magnetron by means of the loop $b$. The coaxial cables $C_1$ and $C_2$ terminate in two loops $b_1$ and $b_2$, the plane of said loops being preferably located in the plane of symmetry of the corresponding guide parallel to its small side, so that said loops receive the maximum magnetic flux. At $I_1$ and $I_2$ are shown two power indicating devices, each of which comprises a rod $t$ that penetrates into one of the guides and a rectifier R connected to a pointer adapted to move over a graduated dial. In such a device, the values of the lengths $l_1$ and $l_2$ correspond to those of Figure 1 i. e.

$$l_1=(2n+1)\lambda/4 \text{ and } l_2=n\frac{\lambda}{2}$$

so that when the anode voltage of the magnetron M is zero, the guide $G_2$ is non-conducting, the guide $G_1$ effects the transmission of the wave, as shown by the arrows in continuous lines and the devices $I_1$ and $I_2$, $I_1$ having its pointer opposite the maximum value and $I_2$ its pointer at zero. If a predetermined voltage V is supplied to the magnetron, the impedance transferred to each of the two guides will be varied and it is only necessary suitably to adjust the value of V in order to reverse the conditions of operation, i. e. to render the guide $G_1$ non-conducting and the guide $G_2$ conducting, as shown by the arrows in dotted lines and the devices $I_1$ and $I_2$, $I_1$ having its pointer on zero and $I_2$ its pointer opposite the maximum value. Such an operation is tantamount to assuming that the operation of each of the two guides alternately corresponds to the points A and B of the curve of Fig. 1.

The embodiment shown in Fig. 3, which relates to a transmitter-receiver device using a single antenna, will now be considered. This figure shows, at GE the transmitter guide and at GR the receiver guide, both leading to the guide that acts as an antenna $A_1$, terminating in its characteristic impedance $Z_c$. At M is shown the magnetron which is adapted to render the two guides alternately non-conducting and conducting by means of the coaxial cables C, $C_1$, $C_2$. The lengths $l$ and $l'$ are adjusted as hereinbefore indicated. At DC is shown the control device that produces the voltage pulses shown symbolically at $i$; said pulses are transmitted on the one hand to the electrode $k$ of the magnetron G which generates U. H. F. transmission signals and which is thus rendered conducting and transmits a signal, and on the other hand to the electrode K of the magnetron M which is likewise thus rendered conducting by means of the adjusting device RE. During the transmission of this signal, the wave passes through the guide GE while the guide GR is on the contrary rendered non-conducting. During the period of time that elapses between the signal and the next signal the reverse effect occurs: GE is made non-conducting and GR conducting. The source S of direct current voltage supplies a positive direct current voltage to both the guides and both the anodes A, $a$ of the two magnetrons, and $P_1$, $P_2$ are pistons for adjusting the two guides. R denotes the receiving device. The arrow in continuous lines represents the wave transmitted, and the other arrow in dotted lines represents the echo received.

Finally, Fig. 4 shows a diagrammatic view of the modification wherein the U. H. F. power that enters the guide G is distributed between the guides $G_1$ and $G_2$, each of which is terminated by a receiving device $R_1$, $R_2$. The same reference numerals designate the same elements as in the previous figures. The adjustment of this distribution can, at will, be effected abruptly or, on the contrary, in a gradual manner. For the sake of simplicity, the complete adjusting circuit, which is the same as that of Fig. 3, has not been shown.

The device according to the invention has numerous advantages as compared with the dual protection system commonly used in radar apparatus and more commonly called "T R" (transmitter-receiver), such a system comprising two ionization tubes, one of which is associated with the transmitter guide and the other with the receiver guide and which successively render said guides non-conducting and conducting by becoming ionized by the effect of the transmitted wave or of the reflected wave. The device according to the invention, in addition to the fact that it eliminates the use of these expensive and fragile tubes, uses a single magnetron that performs the function of both of said tubes at once. Then, in a usual "T R" apparatus, the period of time that elapses between two signals must not be less than the de-ionization time of the tube; this drawback does not exist with the magnetron, since the electrons immediately fall on to the cathode when the voltage is eliminated. Furthermore, it is possible to apply an impulse of much shorter duration to a magnetron than that which is required to ionize a gas tube, a usual "T R" apparatus being unable to operate with impulses of the order of 1/100 of a microsecond that can quite well be used in a magnetron. Owing to the nature of the gas, the precision required for the tube and its shorter life, the ionized tube is less convenient to use than a magnetron, the use of which does not involve all these drawbacks.

In all the examples hereinbefore described, it is possible to use with advantage a copper magnetron which is provided with cavities and is of a special type with rounded anodes, so that the anode surfaces are equi-potential surfaces of the electric field, such as described in the French patent for "Improvements in magnetrons or like tubes intended for the transmission of ultra-short waves," filed by the Compagnie Generale de Telegraphie Sans Fil, on April 18, 1947, two consecutive cavities of the magnetron being in phase opposition, whereby the coupling between the cavities is increased.

What we claim is:

1. An ultra short wave switching device comprising, in combination: a single magnetron having an anode and a cathode, means for applying between said anode and said cathode during a time $t_1$ a voltage V, smaller than the cut-off voltage so as to produce in the anode-cathode space of said magnetron a spatial charge rendering the impedance of this space very small, means for bringing the voltage between cathode and anode to zero during a time $t_2$ consecutive to $t_1$ so as to eliminate said spatial charge and to render the impedance of said space very high, a first wave guide connected and coupled laterally to the said magnetron by a first coaxial line whose length is approximately equal to an odd number of quarter wave lengths whereby the shunt impedance supplied in this first guide by the magnetron and the said first coaxial line is rendered very strong when the anode of the magnetron is at the potential V and very small when the anode is at the potential zero, so as to make the said first guide conductive during the time $t_1$ and non-conductive during the time $t_2$, and a second wave guide connected and coupled laterally to the said single magnetron by a second coaxial line whose length is approximately equal to an integer number of half wave lengths whereby the shunt impedance supplied in this second guide by the magnetron and the said second coaxial line is, on the contrary, rendered very small when the anode of the magnetron is at the potential V and very strong when the anode is at the potential zero so as to make the said second guide non-conductive during the time $t_1$ and conductive during the time $t_2$.

2. A switching device according to claim 1, wherein the two guides are connected by one of their ends to a common aerial and by the other end, respectively, to a receiver and to a pulse transmitter, means being provided for synchronizing the periods of the said pulses with the periods $t_1$ or $t_2$ during which the guide connected to the transmitter is conductive and the guide connected to the receiver, non-conductive.

ANTOINE JEAN ORTUSI.
PATRICE FECHNER.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,403,303 | Richmond | July 2, 1946 |
| 2,422,190 | Fiske | June 17, 1947 |
| 2,438,367 | Keister | Mar. 23, 1948 |
| 2,483,818 | Evans | Oct. 4, 1949 |
| 2,493,706 | Washburne et al. | Jan. 3, 1950 |